G. SANFORD.
Hemp and Flax Dressing Machine.
No. 35,709. Patented June 24, 1862.
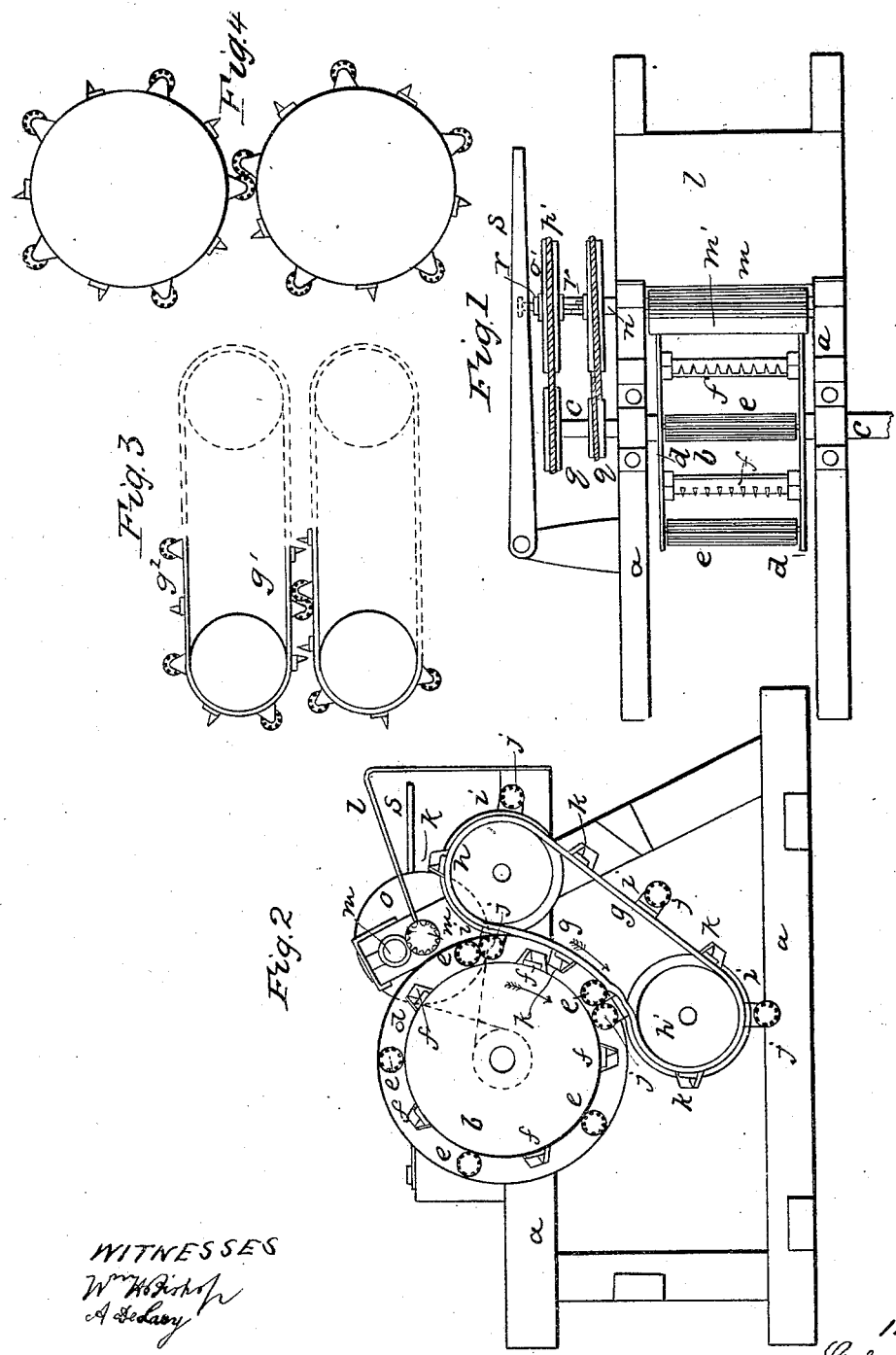
WITNESSES
Wm W Bishop
A DeLacy
INVENTOR
Gelston Sanford

UNITED STATES PATENT OFFICE.

GELSTON SANFORD, OF NEW YORK, N. Y.

IMPROVEMENT IN MACHINERY FOR DRESSING FLAX AND HEMP.

Specification forming part of Letters Patent No. 35,709, dated June 24, 1862.

*To all whom it may concern:*

Be it known that I, GELSTON SANFORD, of the city, county, and State of New York, have invented certain new and useful Improvements in Machinery for Dressing Flax, Hemp, and other like Fiber-Yielding Plants; and I do hereby declare that the following is a full, clear, and exact description thereof, reference being had to the accompanying drawings, making part of this specification, in which—

Figure 1 is a plan of the machine; Fig. 2, a longitudinal vertical section thereof; and Figs. 3 and 4 longitudinal vertical sections of two modifications thereof.

The object of my said invention is more effectually to loosen and separate from the fibers the woody and foreign matter, and with less injury to the fibers than has heretofore been done.

In the accompanying drawings, $a$ represents a suitable frame, and $b$ a cylinder, the shaft $c$ of which is mounted in suitable boxes in the said frame, and to be driven by any suitable motor. The heads $d\ d$ at each end project beyond the periphery of the cylinder to a sufficient extent to receive the journals of a series of parallel rollers, $e$, which rollers I prefer to have fluted. In each space between the rollers, and attached to the periphery of the cylinder, are bars $f$ with hatchel-teeth. These bars should be placed about midway between the rollers. There is an endless apron or belt, $g$, made of leather or other suitable substance, which passes around two rollers, $h\ h'$, mounted in the frame $a$, the one, $h$, having its axis about in the same horizontal plane with the axis of the cylinder $b$, and the other, $h'$, below the said cylinder, the position of the two rollers relatively to the cylinder being such that the upper surface of the apron or belt will lap around a segment of the cylinder, and thus bear against the rollers $e$. To the surface of this apron or belt are secured cross-bars $i$, having ears at each end to receive the journals of rollers $j$, similar to the rollers $e$ on the cylinder $b$, and at the same distance apart; and between these rollers are also secured to the surface of the belt, and midway between the rollers $j$, bars with hatchel-teeth $k$, similar to those on the bars $f$ on the cylinder $b$. As the cylinder is rotated in the direction of the arrow, the rollers $e$ on its periphery act against the rollers $j$ on the apron $g$, which is thereby caused to travel in the same direction, as indicated by the arrow, until the rollers are caused to separate by the travel of the belt around the roller $h'$ at bottom.

The flax or hemp or other fiber-yielding plant to be treated is laid on a feed-table, $l$, and presented to the bite of a pair of feed-rollers, $m\ m'$, the lower one, $m$, being a wooden or metal roller fluted, and the other, $m'$, a plain roller covered with vulcanized india-rubber, or other equivalent elastic substance. The shaft $n$ of the fluted roller $m$ extends to the outside of the frame, and has two loose pulleys, $o$ and $o'$, driven by belts $p\ p'$ from two pulleys, $q\ q'$, on the shaft $c$ of the cylinder, the belt $p$ being crossed. On the shaft $n$ of the fluted roller there is a sliding clutch, $r$, connected with a hand-lever, $s$, by which the operator can shift the clutch so as to clutch either of the said pulleys, as he desires, to feed in the flax or other material, or draw it out of the machine, or unclutch both pulleys to stop the feed-rollers. The upper and elastic roller is free to be turned by the fluted roller, and the journals of its shaft run in boxes, which, if desired, may be borne down by springs, in manner well known to machinists; but if the roller is made sufficiently elastic such springs will not be necessary. As the flax (or other material) is fed in slowly by the feed-rollers it is acted upon on opposite sides by the rollers and hatchel-teeth on the cylinder and endless belt $g$, which travel at a much greater velocity than the feed-motion. By the operation herein stated the flax, &c., is gripped between the rollers on the cylinder and those on the apron $g$, and while gripping they roll on each side of the hemp, bending and breaking the woody part, and in rolling they also slide on the fibers, thereby producing a simultaneous breaking and rubbing action, which effectually breaks and loosens the woody fragments from the fibers, and the hatchels then following act on both sides of the mass of fibers and separate therefrom all the fragments of woody and foreign matter. After a sufficient portion of the length of the fibers has been thus fed in and acted upon, the motion of the feed-rollers is reversed to draw it out, during which reversed motion the action of the rollers and hatchels is slightly increased. When entirely drawn out, the material is reversed and the opposite end fed in and treated in like manner.

Although the hatchels are above described as being formed of teeth projecting from bars on the cylinder and on the apron $g$, I do not wish to confine myself to the use of such form of hatchels, as straight bars may be substituted, although I prefer to use teeth; or, if preferred, some may be straight bars and some of them teeth. In like manner I have described the rollers on the cylinder and on the apron as being fluted, that being, in my judgment, the best; but if desired the rollers may be smooth, in which case the breaking action will be more gentle and less rapid. And although the gripping and feeding mechanism herein described are, in my judgment, the best to be used for feeding in, holding, and withdrawing the material while being acted upon by the rollers and hatchels, it will be obvious that a good result may be obtained by substituting any other suitable feeding and holding mechanism, and even by performing the operations of feeding in, holding, and withdrawing by hand.

If it be desired to use my said invention for the sole purpose of breaking, the hatchels may be dispensed with, and it will be found that after breaking in such a machine the fibers will be in a better condition for scutching than if broken by any of the means heretofore employed for that purpose, on account of the rubbing action of the rollers in breaking; and although I prefer to arrange the two series of rollers and the two series of hatchels one on a cylinder and the other on an endless belt or apron, I do not wish to confine myself to this, as I have contemplated the application of them to two belts or endless aprons, as represented in Fig. 3 of the accompanying drawings, in which the upper belt or apron, $g'$, is substituted for the cylinder in the preferred mode of application. It is deemed unnecessary to represent the feed-rollers in this contemplated mode of application, as any skillful machinist will find sufficient instruction in the foregoing description. And still another mode of application which I have contemplated is represented in Fig. 4 of the accompanying drawings, in which a second cylinder, $b'$, is substituted for the belt or endless apron in Figs. 1 and 2, the two series of rollers and hatchels being arranged on two cylinders, instead of one cylinder and one belt or endless apron.

What I claim as my invention, and desire to secure by Letters Patent, is—

1. The combination of the two series of breaking-rollers, one series arranged on a cylinder and the other on an endless belt or on the equivalents thereof, the one series being driven and imparting motion to the other series, substantially as and for the purpose described.

2. The combination of the two series of hatchels arranged on the cylinder and on the belt or endless apron, or the equivalents thereof, the one series being driven and imparting motion to the other series, substantially as and for the purpose described.

3. The two series of hatchels, in combination with the two series of breaking-rollers, arranged on a cylinder and endless apron or belt, or their equivalents, when one of the said series of breaking-rollers and hatchels is driven and imparts motion to the other series, substantially as and for the purpose described.

4. The feed-rollers, one of which is elastic, in combination with the cylinder and belt or endless apron, or their equivalents, and provided with breaking-rollers and hatchels, or either, substantially as described.

GELSTON SANFORD.

Witnesses:
WM. H. BISHOP,
A. DE LACY.